United States Patent Office 2,856,784
Patented Oct. 21, 1958

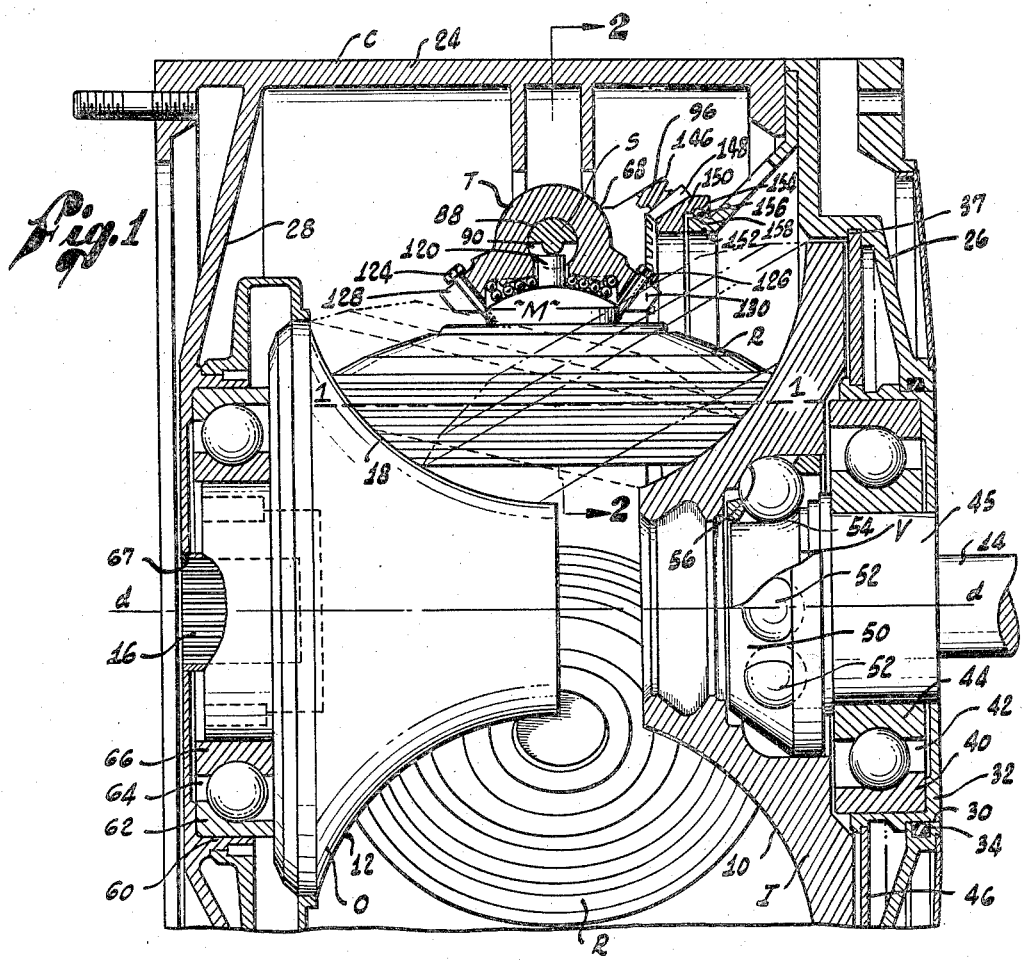
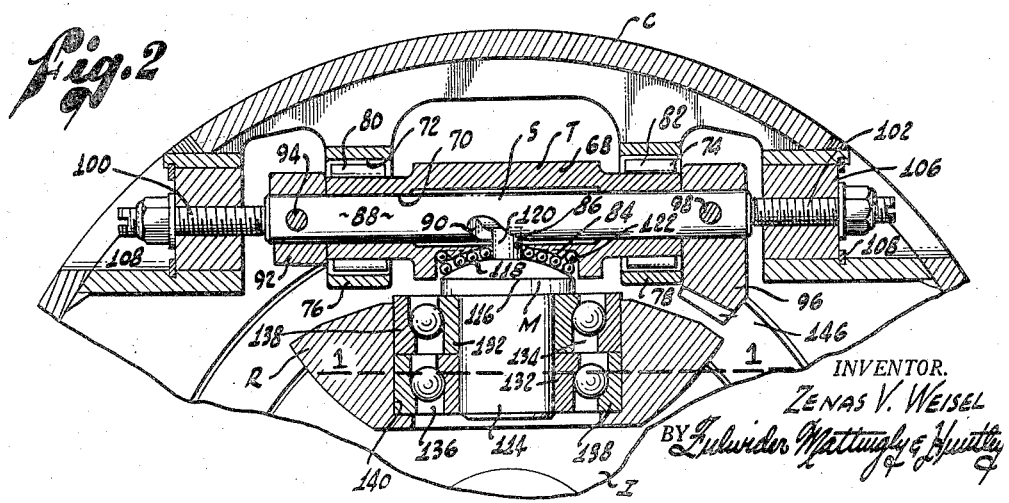

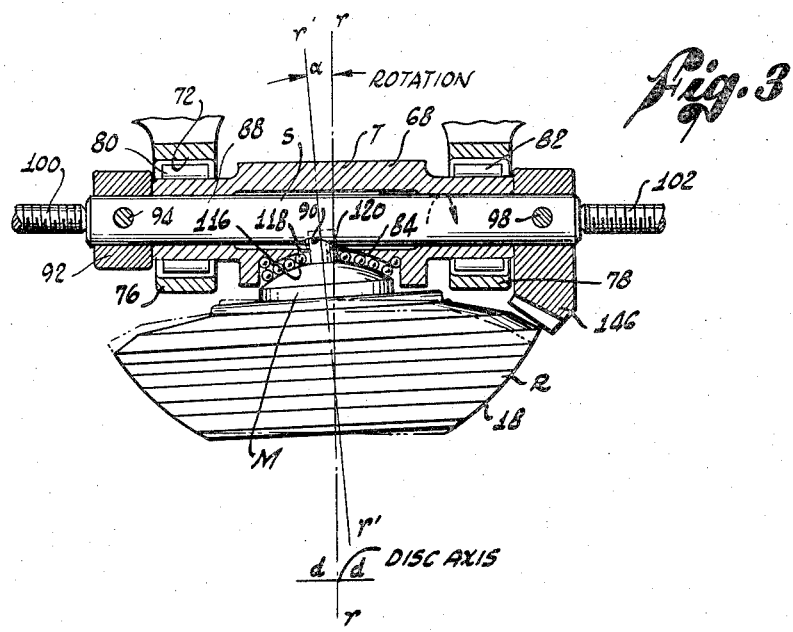
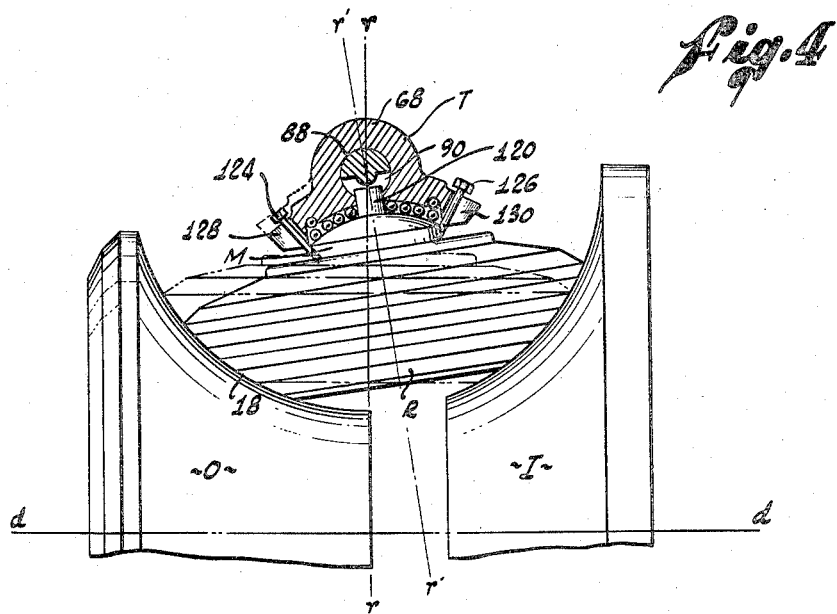

2,856,784

CONICAL ROLLER TRANSMISSION APPARATUS

Zenas V. Weisel, Los Angeles, Calif.

Application May 28, 1956, Serial No. 587,658

16 Claims. (Cl. 74—200)

The present invention relates generally to transmissions and more particularly to a novel and improved conical roller transmission.

In my co-pending patent application Serial No. 363,606, filed June 23, 1953, now Patent No. 2,748,614, issued June 5, 1956, there is disclosed a conical roller transmission incorporating a pair of independently rotatable coaxial driving and driven discs which are bridged by a plurality of conically profiled rolls. The rollers are each supported by mounting means that include a universal mounting for the roller and a tiltable member connecting the universal mounting to the transmission's frame. The transmission is so designed that the rollers normally tend to assume a position wherein the axis of rotation of each roller intersects the axis of rotation of the discs as said discs are rotated. When it is desired to vary the relative speed of the discs, a control action causes a change to take place in the angularity position of the rollers relative to that of the axis of the discs when the discs are rotated. This change in angularity is accomplished by tilting each of the rollers about an axis passing through the center of contact of the rollers with each disc until its axis of rotation no longer intersects the axis of rotation of the discs. The rollers will then automatically move bodily to their new ratio position wherein their axes of rotation again intersect the axis of rotation of the discs. This arrangement permits the surface of the rollers in contact with the surfaces of the discs as said discs are rotated to undergo substantially skid-free rolling movement in a spiral path along the latter surfaces as the rollers move from one ratio position to another. As pointed out in my co-pending patent application, unless the rollers can undergo such skid-free rolling movement, they must be forcibly skidded between ratio positions. Such skidding of the rollers over the discs gives rise to three major disadvantages. (a) It necessitates a comparatively low power capacity so as to avoid complete loss of traction during a change in ratio as the rollers are skidded from one position to another, (b) it requires a very heavy control force to urge the rollers to skid between ratio positions, and (c) the rate at which the ratio positions undergo change must be comparatively slow so as to avoid damage to the traction surfaces of the rollers and the disc members.

It is a major object of the present invention to provide a conical roller transmission generally similar to that covered by my above-identified application but incorporating a different roller mounting structure. The structure of the present invention permits the rollers to undergo substantially skid-free rolling movement between ratio positions and generally affords the same advantages as that disclosed in my above-mentioned prior application.

Another object of the present invention is to provide a conical roller transmission which is extremely efficient at all speeds and under all load conditions.

An additional object of the invention is to provide a conical roller transmission which is capable of transmitting a maximum amount of power for a minimum weight and size.

It is another object to provide a conical roller transmission wherein tracking of the rollers on the discs is relatively insensitive to deflections, differential expansion, tolerance variations in machining and to variations in power load.

Yet an additional object of the invention is to provide a conical roller transmission which is compact and yet capable of transmitting a heavy load over an extended period of time without requiring attention.

A further object is to provide a conical roller transmission using wide-faced rollers which operate at a minimum roller-to-disc loading force relative to the traction force.

It is yet another object of the present invention to provide a conical roller transmission which requires a minimum amount of control force in order to shift the rollers from one ratio position to another.

Another object is to provide a conical roller transmission which is simple in design and rugged of construction whereby it may afford a long and trouble-free service life.

These and other objects and advantages of the present invention will become apparent from the following detailed description, when taken in conjunction with the appended drawings, wherein:

Figure 1 is a longitudinal vertical sectional view of a preferred form of conical roller transmission embodying the present invention.

Figure 2 is a vertical sectional view taken on line 2—2 of Figure 1;

Figure 3 is a front view showing the preliminary preparatory movement of a roller before undergoing a change in ratio positon; and Figure 4 is a side view showing such roller movement.

Referring to the drawings, the preferred form of conical roller transmission embodying the present invention broadly comprises a frame or casing C which independently rotatably supports a driving or input disc I and a driven or output disc O. These discs are formed with spaced-apart opposed concave surfaces of revolution approximating a toric section and designated 10 and 12, respectively. The driving disc I is connected to a drive shaft 14 by a torque responsive thrust varying means V, while the driven disc O carries a splined sleeve 16 for receiving an output shaft (not shown). A plurality of conically profiled rollers R are interposed between the disc I and O. Each of these rollers R is formed with a convex surface 18, bridging the concave surfaces 10 and 12 of the input and output discs I and O. The rollers R are each supported by a roller-carrying member M. A trunnion member T is interposed between each roller-carrying member M and the frame C. A steering member S is interposed between each roller R and its trunnion member T. Rotation of the driving disc I is transferred to the driven disc O by means of the rollers R, the driven disc O rotating in the opposite direction from the driving disc I. Variation of the relative speeds of the two discs is accomplished by means of the steering member S, the actuation of which bring about a change in the angularity of the rollers R relative to the discs as said discs are rotated, as indicated by the dotted showing of the rollers in Figure 1.

More particularly, the casing C is of annular transverse cross-section having an outer wall 24, a removable front wall 26 and an integral rear wall 28. The front wall 26 is formed with a coaxial opening 30 wherein is disposed a retainer cup 32. A seal ring 34 is interposed between the front wall and front portion of this retainer cup. The retainer cup 32 encompasses the outer element 40 of a ball bearing assembly 42. The inner element 44 of the latter assembly encompasses a boss 45 formed on the drive shaft 14. A flexible, dished-disc type pre-load spring 46 is interposed between the rear portion of the retainer cup 32 and a shoulder 37 formed in the front wall 26. This preload spring 46 constantly exerts a rearwardly acting force upon the retainer cup 32 for a purpose to be described hereinafter.

The torque responsive thrust varying means V may be similar to one of the forms disclosed in my above-described co-pending application Serial No. 363,606. It should be particularly observed, however, that other types of torque responsive thrust varying means may be employed without departing from the scope of the present invention. The particular type of torque varying means disclosed herein is of the angular contact cam type and includes a retainer 50 for a plurality of balls 52. As shown in Figure 1, the inner raceway 54 for these balls 52 is formed on the rear end of the drive shaft 14. The outer raceway 56 is formed at the front portion of the driving disc I. This outer raceway 56 includes a plurality of pockets defining cam surfaces which are inclined axially relative to the axis of rotation of the two discs. The mode of operation of the torque responsive thrust varying means V will be fully set forth hereinafter.

The rear wall 28 is formed with an inwardly directed annular flange 60 that encompasses the outer element 62 of the rear ball bearing assembly 64. The inner element 66 of the rear ball bearing assembly encompasses the output sleeve 16. The rear wall 28 is coaxially formed with an annular opening 67 for receiving the output sleeve 16.

Each of the trunnion members T is of integral, generally cylindrical configuration having a main body 68 of enlarged diameter. A longitudinal bore 70 extends through the length of the trunnion member T. The opposite ends of the trunnion member T are supported within aligned bores 72 and 74 formed in a pair of ears 76 and 78 constituting integral inward extensions of the outer casing's wall 24 by a pair of roller bearings 80 and 82, respectively. With this arrangement, the trunnion member T is rotatable about an axis which is normal to the axis of rotation d—d of the disc I and O and spaced radially outwardly therefrom. One side of the body 68 is formed with a generally semi-hemispherical concave cavity 84, the mid-portion of which merges into a radially extending bore 86 that intersects the longitudinal bore 70. It should be noted that the center of curvature of the cavity 84 substantially coincides with a line 1—1 passing through the center of contact of the roller R and the disc members I and O, as indicated in Figures 1 and 2.

Each of the steering members S includes a cylindrical bar 88 that is rotatably journaled within the longitudinal bore 70 of a trunnion member T. The mid-portion of the bar 88 is formed with a helical slot 90. A retainer 92 is rigidly affixed to one end of the bar 88 by a pin 94 and a hypoid gear 96 is rigidly keyed to the opposite end of the bar 88 by a second pin 98, the retainer 92 and hypoid gear 96 abutting respective end faces of trunnion T for approximate zero relative axial movements of bar 88 relative to the trunnion T. The bar 88 with associated trunnion T may be centered relative to the casing C and the discs I and O by a pair of set screws 100 and 102 which are carried by opposed plugs 104 and 106, respectively, that are removably affixed to the casing C by snap rings 108.

Each of the roller-carrying members M includes a shaft 114 at the radially outer end of which is formed a support pad 116 of enlarged diameter. The radially outer portion of the support pad 116 is formed with a semi-hemispherical convex surface 118 which is complementary to the concave cavity 84 formed in the body 68 of the trunnion member T. The center of curvature of the convex surface 118 substantially coincides with the center of curvature of the cavity 84. A follower pin 120 protrudes from the center of the support pad 116 through the radially extending bore 86 formed on the trunnion member T. A plurality of ball elements 122 are interposed between the concave cavity 84 and the convex surface 118. Referring particularly to Figure 1, the roller-carrying member M is provided with a pair of rotation stop elements 124 and 126 in the form of a pair of bolts which are disposed within grooves 128 and 130, respectively, formed in the body 68 of the trunnion member T.

Each roller shaft 114 is encompassed by the inner elements 132 of a pair of axial thrust type ball bearing assemblies 134 and 136. The outer elements 138 of these bearing assemblies are fitted within a coaxial cavity 140 formed in a roller R. With this arrangement, the radially outwardly directed forces to which the rollers R are subjected are transferred to the casing C through the roller-carrying member M, the balls 122, the trunnion member T and the ears 76 and 78. The threaded end of the rotation stop bolts 124 and 126 are threadably secured to the front and rear ends, respectively, of the support pad 116 at the mid-portion thereof. These rotation stop bolts serve to positively restrain the support pad 116 from rotating relative to the trunnion member T. The rotation stop bolts also serve to loosely interconnect the roller-carrying and trunnion members during assembly and disassembly of the transmission so as to prevent loss of the ball elements 122. As indicated in Figure 3, the width of the rotation stop bolt-receiving grooves 128 and 130 is sufficient to permit a limited amount of tilting movement of the roller-carrying member relative to the trunnion member in a transverse plane and sufficient clearance is allowed under the head of the stop bolts and the adjacent surface of the trunnion T to also permit limited tilting movement in a plane passing through the roller axis and the axis of rotation of the discs.

Referring again to Figure 1, each hypoid gear 96 is formed with teeth 146 that are engaged with complementary teeth 148 formed in the outer periphery of a control ring 150. The control ring 150 is coaxially rotatably supported within the casing C by a support ring 152 having its outer portion rigidly affixed to the casing. The adjoining surfaces of the control and support rings are formed with complementary semi-circular grooves 154 and 156 wherein are disposed a plurality of ball elements 158. The control ring 150 is adapted to undergo limited rotation in either direction under the influence of a manually or automatically operated control system (not shown).

In the operation of the aforedescribed transmission the preload spring 46 constantly biases the front ball bearing assembly 42 and the drive shaft 14 rearwardly towards the driven disc O so as to obtain preloading of the rollers against the discs and of the torque responsive thrust varying means. Upon the application of torque upon the drive shaft 14 above that which through cam action will equal the thrust load of the preload spring 46, the balls 52 will tend to cam the driving disc I rearwardly or to the left in Figure 1 so as to increase the pressure of the driving disc against the rollers R and of the latter against the driven disc O. The greater the torque the larger the force effected by the torque responsive means V tending to create a thrust urging the driving disc I rearwardly. With this arrangement, the contact pressure of the rollers R against the concave surfaces 10 and 12 of the discs I and O will be automatically regulated. The contact pressure of the rollers against the discs will always be equal because of the freedom of the rollers to float axially relative to the discs. This axial float of the rollers is not impeded because of the swivel action afforded by the movement of the support pad's convex surfaces 118 relative to the trunnion members' concave surfaces 84.

When it is desired to change the relative speeds of the driving and driven discs I and O, the control ring 150 will be rotated through a limited number of degrees in the direction necessary to effect such change. Referring now to Figure 3, such rotation of the control ring 150 will effect concurrent rotation of each of the hypoid gears 96 and steering bars 88. Rotation of the steering bars 88 serves to effect concurrent tilting of the roller-carrying members M and hence of the rollers R from their dotted outline position in this figure to their solid outline position therein. This tilting is effected by the camming action of the steering bar slot 90 upon the follower pin 120 of the roller-carrying member.

As indicated in Figure 3, the axis of rotation $r$—$r$ of each roller R normally intersects the axis of rotation $d$—$d$ of the discs I and O. Rotation of the control ring 150, however, will cause each roller to be tilted in a counter-clockwise direction in the manner described immediately hereinabove until its axis of rotation no longer intersects the axis of rotation $d$—$d$ of the discs, as indicated by the reference numerals $r'$—$r'$. When the roller has been moved to its solid outline position of Figure 3 in preparation for a change to a new ratio position, it will be in a state of unbalance relative to the discs I and O inasmuch as each of the rollers normally tend to assume a position wherein its axis of rotation intersects the axis of rotation of the discs so long as the discs are being rotated. In order for the system to again reach a state of balance, upon continued rotation of the discs, the roller R will automatically tilt or swing bodily about the longitudinal axis of the trunnion member T from its dotted outline position of Figure 4 to the solid outline position therein. It will also tilt about axis 1—1 of Figure 2 as the trunnion body 68 rotates relative to the steering bar 88, the latter's follower pin 120 sliding along the steering bar slot 90, until the axis of rotation of the roller will again intersect that of the discs. In this manner the roller will automatically move to its new ratio position. During such movement, the convex surface 18 of each roller R in contact with the contact surfaces 10 and 12 of the rotating discs will undergo substantially skid-free rolling movement in a spiral path along the latter surfaces. When the rollers reach their new ratio position, the system will again be in a state of balance and little if any force must be applied to the control system in order to maintain the rollers in such new position.

While there has been shown and described hereinbefore what is considered to be the preferred embodiment of the present invention, various changes and modifications may be made with respect thereto without departing from the spirit of the invention or the scope of the following claims.

I claim:

1. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a concave cavity generally facing the axis of rotation of said discs; a roller-carrying member having a shaft that is encompassed by said roller and a support pad disposed at one end of said shaft, said support pad being formed with a convex surface complementary to said cavity and disposed adjacent the latter whereby said trunnion member supports said roller-carrying member with said roller being free to undergo tilting movement in a plane containing said trunnion axis, the axis of rotation of said roller normally substantially intersecting the axis of rotation of said discs; and steering means connected to said roller-carrying member for tilting said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

2. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a concave cavity generally facing the axis of rotation of said discs and having a center of curvature that substantially coincides with a line passing through the center of contact of said roller and said discs; a roller-carrying member having a shaft that is encompassed by said roller and a support pad disposed at one end of said shaft, said support pad being formed with a convex surface complementary to said cavity and having the same center of curvature, said convex surface being disposed adjacent said cavity whereby said trunnion member supports said roller-carrying member with said roller being free to undergo tilting movement in a plane containing said trunnion axis, the axis of rotation of said roller normally substantially intersecting the axis of rotation of said discs; and steering means connected to said roller-carrying member for tilting said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surface of said disc members undergoing substantially skid-free rolling movement in a spiral path along the latter surface as said discs are rotated.

3. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of said discs and spaced radially outwardly therefrom, said trunnion member being formed with a concave cavity generally facing the axis of rotation of said discs; a steering bar supported adjacent said trunnion member; a roller-carrying member having a shaft that is encompassed by said roller and a support pad disposed at one end of said shaft, said support pad being formed with a convex surface complementary to said cavity and disposed adjacent the latter whereby said trunnion member supports said roller-carrying member with said roller being free to undergo tilting movement in a plane containing said trunnion axis, the axis of rotation of said roller normally substantially intersecting the axis of rotation of said discs; and means interconnecting said support pad and said steering bar for tilting said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

4. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a concave cavity generally facing the axis of rotation of said discs and having a center of curvature that substantially coincides with a line passing through the center of contact of said roller and said discs; a steering bar supported adjacent said trunnion member; a roller-carrying member having a shaft that is encompassed by said roller and a support pad disposed at one end of said shaft, said support pad being formed with a convex surface complementary to said cavity and having the same center of curvature, said convex surface being disposed adjacent the latter whereby said trunnion member supports said roller-carrying member with said roller being free to undergo tilting movement in a plane containing said trunnion axis, the axis of rotation of said roller normally substantially intersecting the axis of rotation of said discs; and means interconnecting said support pad and said steering bar for tilting said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

5. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a concave cavity generally facing the axis of rotation of said discs, and a radially extending bore intersecting said cavity; a steering bar supported adjacent said trunnion member and formed with a helical slot; a roller-carrying member having a shaft that is encompassed by said roller and a support pad disposed at one end of said shaft, said support pad being formed with a convex surface complementary to said cavity and disposed adjacent the latter whereby said trunnion member supports said roller-carrying member with said roller being free to undergo tilting movement in a plane containing said trunnion axis, the axis of rotation of said roller normally substantially intersecting the axis of rotation of said discs; and a follower pin extending from said support pad through said radially extending bore into said helical slot whereby rotation of said steering bar will effect tilting of said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

6. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a concave cavity generally facing the axis of rotation of said discs and having a center of curvature that substantially coincides with a line passing through the center of contact of said roller and said discs, and a radially extending bore intersecting said cavity; a steering bar journaled adjacent said trunnion member and formed with a helical slot; a roller-carrying member having a shaft that is encompassed by said roller and with a convex surface complementary to said cavity and having the same center of curvature, said convex surface being disposed adjacent said cavity whereby said trunnion member supports said roller-carrying member with said roller being free to undergo tilting movement in a plane containing said trunnion axis, the axis of rotation of said roller normally substantially intersecting the axis of rotation of said discs; and a follower pin extending from said support pad through said radially extending bore into said helical slot whereby rotation of said steering bar will effect tilting of said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

7. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a longitudinal bore extending along said trunnion axis, said trunnion member also being formed with a concave cavity generally facing the axis of rotation of said discs and a radially extending bore interconnecting the center of said cavity and said bore; a steering bar journaled within said longitudinal bore, the mid-portion of said steering bar being formed with a helical slot; a roller-carrying member having a shaft that is encompassed by said roller and a support pad disposed at one end of said shaft, said support pad being formed with a convex surface complementary to said cavity and disposed adjacent the latter whereby said trunnion member supports said roller-carrying member with said roller being free to undergo tilting movement in a plane containing said trunnion axis, the axis of rotation of said roller normally substantially intersecting the axis of rotation of said discs; and a follower pin extending from said support pad through said radially extending bore into said helical slot whereby rotation of said steering bar will effect tilting of said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

8. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a longitudinal bore extending along said trunnion axis, said trunnion member also being formed with a concave cavity generally facing the axis of rotation of said discs and having a center of curvature that substantially coincides with a line passing through the center of contact of said roller and said discs, and a radially extending bore interconnecting the center of said cavity and said bore; a steering bar journaled within said longitudinal bore, the mid-portion of said steering bar being formed with a helical slot; a roller-carrying member having a shaft that is encompassed by said roller and a support pad disposed at one end of said shaft, said support pad being formed with a convex surface complementary to said cavity and having the same center of curvature, said convex surface being disposed adjacent said cavity whereby said trunnion member supports said roller-carrying member with said roller being free to undergo tilting movement in a plane containing said trunnion axis, the axis of rotation of said roller normally substantially intersecting the axis of rotation of said discs; and a follower pin extending from said support pad through said radially extending bore into said helical slot whereby rotation of said steering bar will effect tilting of said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc member undergoing substantially skid-free rolling movement in a spiral path along the latter surfaces of said discs are rotated.

9. A conical roller transmission, comprising: a frame a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a longitudinal bore extending along said trunnion axis, said trunnion member also being formed with a concave cavity generally facing the axis of rotation of said discs and a radially extending bore interconnecting the center of said cavity and said bore; a steering bar journaled within said longitudinal bore, the mid-portion of said steering bar being formed with a helical slot; a roller-carrying member having a shaft that is encompassed by said roller and a support pad disposed at one end of said shaft, said support pad being formed with a convex surface complementary to said cavity and disposed adjacent the latter; a plurality of ball elements interposed between said cavity and said convex surface; retaining and rotation stop elements interposed between said trunnion member and said roller-carrying member adapted to prevent relative rotation of said roller-carrying member and said trunnion member and to retain said parts as a sub-assembly with said trunnion member supporting said roller-carrying member and with said roller being free to undergo tilting movement in a plane containing said trunnion axis, the axis of rotation of said roller normally substantially intersecting the axis of rotation of said discs; and a follower pin extending from said support pad through said radially extending bore into said helical slot whereby rotation of said steering bar will effect tilting of said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

10. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a longitudinal bore extending along said trunnion axis, said trunnion member also being formed with a concave cavity generally facing the axis of rotation of said discs and having a center of curvature that substantially coincides with a line passing through the center of contact of said roller and said discs, and a radially extending bore interconnecting the center of said cavity and said bore; a steering bar journaled within said longitudinal bore, the mid-portion of said steering bar being formed with a helical slot; a roller-carrying member having a shaft that is encompassed by said roller and a support pad disposed at one end of said shaft, said support pad being formed with a convex surface complementary to said cavity and having the same center of curvature, said convex surface being disposed adjacent said cavity; a plurality of ball elements interposed between said cavity and said convex surface; rotation stop elements interposed between said trunnion member and said roller-carrying member restraining them against relative rotation in a plane normal to said trunnion axis, said roller being free to undergo tilting movement in a plane containing said trunnion axis, the axis of rotation of said roller normally substantially intersecting the axis of rotation of said discs; and a follower pin extending from said support pad through said radially extending bore into said helical slot whereby rotation of said steering bar will effect tilting of said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surface of said disc members undergoing substantially skid-free rolling movement in a spiral path along the latter surfaces as said discs are rotated.

11. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a concave cavity generally facing the axis of rotation of said discs and having a center of curvature that substantially coincides with a line passing through the center of contact of said roller and said discs; a steering bar supported adjacent said trunnion member; a roller-carrying member having a shaft that is encompassed by said roller and a support pad disposed at one end of said shaft, said support pad being formed with a convex surface complementary to said cavity and having the same center of curvature, said convex surface being disposed adjacent the latter whereby said trunnion member supports said roller-carrying member with said roller being free to undergo tilting movement in a plane containing said trunnion axis, the axis of rotation of said roller normally substantially intersecting the axis of rotation of said discs; a control ring rotatably supported by said frame; and gearing interposed between said control ring and said steering bar for rotating the latter, thereby tilting said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

12. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a concave cavity generally facing the axis of rotation of said discs, and a radially extending bore intersecting said cavity; a steering bar supported adjacent said trunnion member and formed with a helical slot; a roller-carrying member having a shaft that is encompassed by said roller and a support pad disposed at one end of said shaft, said support pad being formed with a convex surface complementary to said cavity and disposed adjacent the latter whereby said trunnion member supports said roller-carrying member with said roller being free to undergo tilting movement in a plane containing said trunnion axis, the axis of rotation of said roller normally substantially intersecting the axis of rotation of said discs; a control ring rotatably supported by said frame; gearing interposed between said control ring and said steering bar whereby rotation of said control ring will effect concurrent rotation of said steering bar; and a follower pin extending from said support pad through said radially extending bore into said helical slot whereby rotation of said steering bar will effect tilting of said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

13. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a longitudinal bore extending along said trunnion axis, said trunnion member also being formed with a concave cavity generally facing the axis of rotation of said discs and a radially extending bore interconnecting the center of said cavity and said bore; a steering bar journaled within said longitudinal bore, the mid-portion of said steering bar being formed with a helical slot; a roller-carrying member having a shaft that is encompassed by said roller and a support pad disposed at one end of said shaft, said support pad being formed with a convex surface complementary to said cavity and disposed adjacent the latter whereby said trunnion member supports said roller-carrying member with said roller being free to undergo tilting movement in a plane containing said trunnion axis, the axis of rotation of said roller normally substantially intersecting the axis of rotation of said discs; a control ring rotatably supported by said frame; gearing interposed between said control ring and said steering bar whereby rotation of said control ring will effect concurrent rotation of said steering bar; and a follower pin extending from said support pad through said radially extending bore into said helical slot whereby rotation of said steering bar will effect tilting of said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

14. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a longitudinal bore extending along said trunnion axis, said trunnion member also being formed with a concave cavity generally facing the axis of rotation of said discs and having a center of curvature that substantially coincides with a line passing through the center of contact of said roller and said discs, and a radially extending bore interconnecting the center of said cavity and said bore; a steering bar journaled within said longitudinal bore, the mid-portion of said steering bar being formed with a helical slot; a roller-carrying member having a shaft that is encompassed by said roller and a support pad disposed at one end of said shaft, said support pad being formed with a convex surface complementary to said cavity and having the same center of curvature, said convex surface being disposed adjacent said cavity; a plurality of ball elements interposed between said cavity and said convex surface; rotation stop elements interposed between said trunnion member and said roller-carrying member restraining them against relative rotation in a plane normal to said trunnion axis, whereby said trunnion member supports said roller-carrying member with said roller being free to undergo tilting movement in a plane containing said trunnion axis, the axis of rotation of said roller normally substantially intersecting the axis of rotation of said discs; a control ring rotatably supported by said frame; gearing interposed between said control ring and said steering bar whereby rotation of said control ring will effect concurrent rotation of said steering bar; and a follower pin extending from said support pad through said radially extending bore into said helical slot whereby rotation of said steering bar will effect tilting of said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surface of said disc members undergoing substantally skid-free rolling movement in a spiral path along the latter surfaces as said discs are rotated.

15. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom; a roller-carrying member having a shaft that rotatably supports said roller and a support element disposed at one of its ends; connection means joining said trunnion member and the support element of said roller-carrying member, said connection means permitting said roller to freely undergo tilting movement in a plane containing said trunnion axis with the axis of rotation of said roller normally intersecting the axis of rotation of said discs; a steering bar supported by said frame adjacent said trunnion member; and a follower element extending from the support element of said roller-carrying member and connected to said steering bar whereby rotation of said steering bar will effect tilting of said roller-carrying member in said plane until the axis of rotation of said roller no longer intersects the axis of rotation of said disc in preparation for a change to a new ratio position wherein the axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

16. A conical roller transmission, comprising: a frame; a pair of independently rotatable coaxial driving and driven discs formed with spaced-apart opposed concave surfaces of revolution approximating a toric section; a conically profiled roller interposed between said discs and formed with a convex surface bridging the concave surfaces thereof; a trunnion member supported by said frame and having a trunnion axis normal to the axis of rotation of said discs and spaced radially outwardly therefrom, said trunnion member being formed with a longitudinal bore extending along said trunnion axis; a steering bar journaled within said longitudinal bore, said steering bar being formed with a helical slot; a roller-carrying member having a shaft that is encompassed by said roller and a support element at one end of said shaft; connection means interconnecting the support element of said roller-carrying member and said trunnion member whereby said trunnion member supports said roller-carrying member with said roller being free to undergo tilting movement in a plane containing said trunnion axis, the axis of rotation of said roller normally substantially intersecting the axis of rotation of said discs; and a follower pin extending from said support element through said radially extending bore into said helical slot whereby rotation of said steering bar will effect tilting of said roller-carrying member in said plane until the axis of rotation of said roller no longer intersects the axis of rotation of said discs in preparation for a change to a new ratio position wherein said axes will again intersect, said trunnion member rotating about said trunnion axis so as to permit said roller to swing bodily to said new ratio position with its surface in contact with the surfaces of said disc members undergoing substantially skid-free rolling movement in a spiral path along the latter surfaces as said discs are rotated.

References Cited in the file of this patent
UNITED STATES PATENTS
2,748,614     Weisel _____ June 5, 1956